(No Model.)
A. S. SPAULDING.
FLEXIBLE DOOR.
No. 532,489.          Patented Jan. 15, 1895.
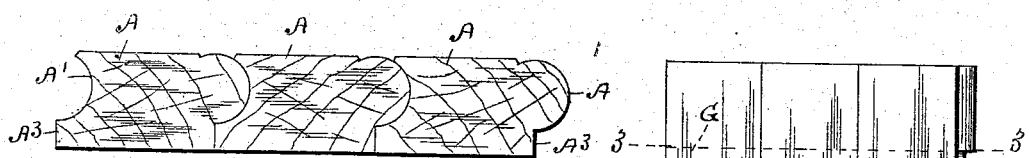
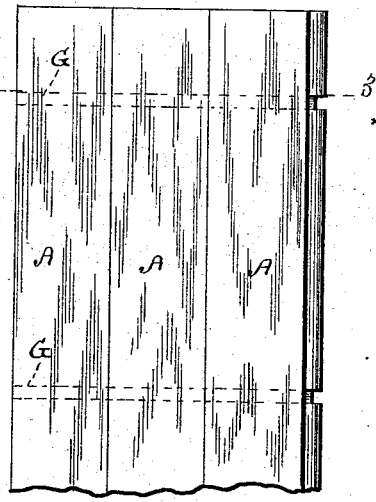
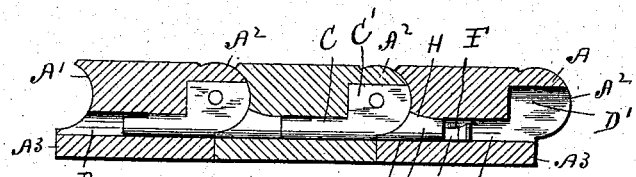
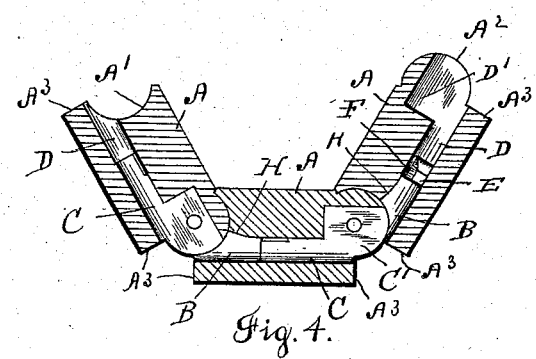
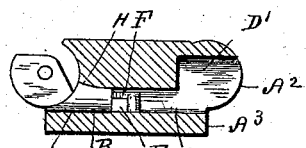
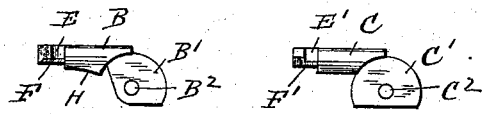
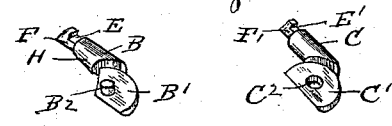
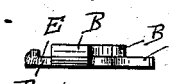
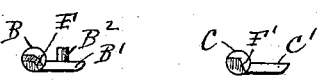
Witnesses.
Allie C. Whiting.
Emma Koester
Inventor.
Algonon Seadon Spaulding
By his Attorney.
Rufus B. Fowler.

UNITED STATES PATENT OFFICE.

ALGENON S. SPAULDING, OF WORCESTER, MASSACHUSETTS, ASSIGNOR TO THE FLEXIBLE DOOR AND SHUTTER COMPANY, OF PORTLAND, MAINE.

FLEXIBLE DOOR.

SPECIFICATION forming part of Letters Patent No. 532,489, dated January 15, 1895.

Application filed April 4, 1892. Serial No. 427,643. (No model.)

*To all whom it may concern:*

Be it known that I, ALGENON S. SPAULDING, a citizen of the United States, residing at Worcester, in the county of Worcester and State of Massachusetts, have invented a new and useful Improvement in Flexible Doors, of which the following is a specification containing a full, clear, and exact description of the same, reference being had to the accompanying drawings, in which—

Figure 1 denotes a portion of the body of the door shown in front elevation. Fig. 2 is an end view of the same. Fig. 3 is a transverse sectional view on line 3, 3, Fig. 1. Fig. 4 represents the same sectional view shown in Fig. 3, but with the leaves forming an angle with each other. Fig. 5 is a transverse sectional view of one of the leaves and showing one of the hinge-bolts in position. Fig. 6 is a top view of one of the hinge-bolts. Fig. 7 represents the under side of the other hinge-bolt, which with the hinge bolt shown in Fig. 6 form a "pair." Figs. 8 and 9 show edge views of the hinge-bolts shown in Figs. 6 and 7 respectively. Figs. 10 and 11 are perspective views of the two hinge-bolts forming a pair and Figs. 12 and 13 show end views of the same.

Similar letters refer to similar parts in the different figures.

My invention relates to the flexible body of a door, or curtain consisting of a series of parallel bars, or leaves hinged together at their edges and adapted to close the door, or window opening; for the flexible curtains of roll top desks; the movable partitions of rooms and for similar purposes; and it relates particularly to the method by which the parallel leaves are hinged together at their edges.

In Fig. 1, I have shown the ends of three parallel bars, or leaves forming a portion of the body of the door and in Fig. 2 I have represented an end view of the same, showing alternate convex and concave edges of the leaves, fitting each other and forming an articulated joint between the edges of adjacent leaves; the leaves being preferably provided with shoulders which are made to abut when the leaves are brought into the same plane as represented in Figs. 1, 2 and 3 and permitting the flexure of the door in one direction only.

Referring to the drawings, A denotes the leaves of which the body of the door is formed, and consisting of parallel strips, or bars preferably formed of wood and provided with a concave edge A' and upon the opposite edge with a convex bead $A^2$, fitting the concave edge of the next adjacent leaf, each leaf being preferably provided with shoulders $A^3$ which are made to abut when the leaves are extended in the same plane and permitting the leaves to be turned in but one direction as represented in Fig. 4.

The leaves A are hinged together at their edges by means of hinge-bolts B and C which are represented in different views in Figs. 6 to 13. The bolts B and C are inserted in the body of the parallel leaves and are provided with flattened ends, or heads B' and C', the head B' being provided with a projecting spur $B^2$ forming a pintle which is received within a hole $C^2$ in the head C' thereby hinging the bolts B and C together; the pintle B' when the bolts are in position being made concentric with the convex bead $A^2$ and concave edge A'. The shapes of the heads C' shown in Figs. 3 and 4 differ slightly in shape from the shape of the heads C', as shown in Figs. 6 to 13; but this variation is immaterial and in nowise affects the operation or function of the device.

In order to insert the hinge-bolts, holes D are bored transversely through the leaves A and a recess D' is formed to receive the head C' of the bolt C, bringing the hole $C^2$ concentric with the convex bead $A^2$. The bolt B is inserted in the opposite edge of the leaf A with the head B' projecting and bringing the pintle $B^2$ concentric with the concave edge A'.

The inner ends of the bolts B and C are notched; the bolt B being provided with a notch E and the bolt C having a notch E'. The notched ends of the bolts are made to overlap each other when the bolts are placed in position in the leaves A with the notched end of the bolt B engaging the notched end of the bolt C and preventing them from being withdrawn. In order to allow the ends to pass each other a portion of each of the notched ends is cut away as shown at F, F', Figs. 6 to 13 and the bolts are inserted in the leaves by placing the bolt C in its proper position and inserting the bolt B in the opposite edge of the leaf with its head B' in a plane at right angles with the head C so the notched end will enter the space at F' and the notched end of the bolt C will occupy the space at F. The bolt B is then turned a quarter of a revolution so the head B' will lie in a plane parallel with the head C' and causing the notched ends to engage each other. A bolt C is then hinged upon the pintle B² and inserted in the next leaf in the opposite edge of which I insert another bolt B rotating it a quarter of a revolution so as to engage its notched end with the notched end of the bolt C as already described, the portions cut away at F and F' allowing the inner ends of the bolts B and C to overlap until the notch E comes opposite the tip of the bolt C and the notch E' opposite the tip of bolt B, allowing the bolt B to be rotated one quarter of a revolution, so the notched ends will engage each other.

A series of hinge-bolts can be inserted within the leaves A at such distance apart as will afford the requisite strength; two rows being shown by the broken lines at G, G, Fig. 1.

The bolt B is provided with a tapering side H so as to crowd against the leaf A in order to press the side H' of the bolt closely against the wall of the hole D and maintain the pintle B² concentric with the concave edge A'.

I do not herein claim broadly hinge-bolts for uniting the leaves of a flexible door and having their inner ends overlapping each other and provided with notches by which the inner ends of the hinge-bolts mutually interlock or engage each other. Such were shown and claimed in my pending application, Serial No. 423,461.

What I claim as my invention, and desire to secure by Letters Patent, is—

1. In a flexible door the combination with a series of parallel bars, or leaves, of connecting bolts held in said leaves and hinged together at their outer ends, said bolts having overlapping and notched ends by which the bolts in the opposite edges of each leaf are interlocked, said overlapping ends of the bolts being cut away at their sides so as to allow their notched ends to be overlapped and interlocked by a partial rotation of one of the bolts about the other, substantially as described.

2. In a flexible door the combination with a series of parallel bars, or leaves, of connecting bolts held in said leaves, the bolts held in opposite edges of each leaf having their inner ends overlapping and provided with engaging notches E, E' and having sections removed at F, F' so as to allow the notched ends of said bolts to overlap each other and be interlocked by a partial rotation, substantially as described.

Dated this 28th day of March, 1892.

ALGENON S. SPAULDING.

Witnesses:
RUFUS B. FOWLER,
H. W. FOWLER.